Aug. 27, 1968    A. TENDLER    3,398,627
ANCHOR BOLTS
Filed Oct. 4, 1966    2 Sheets-Sheet 2
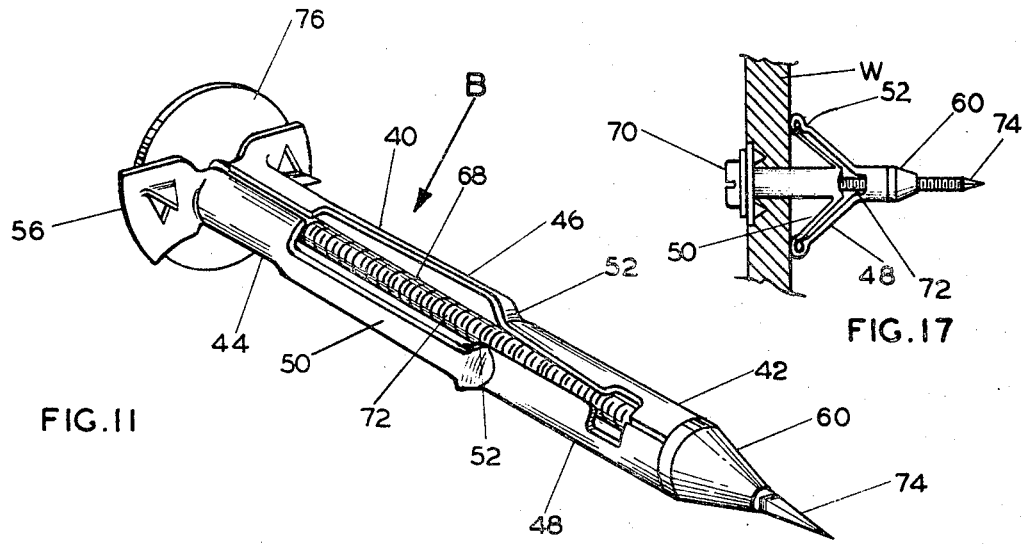
FIG.11
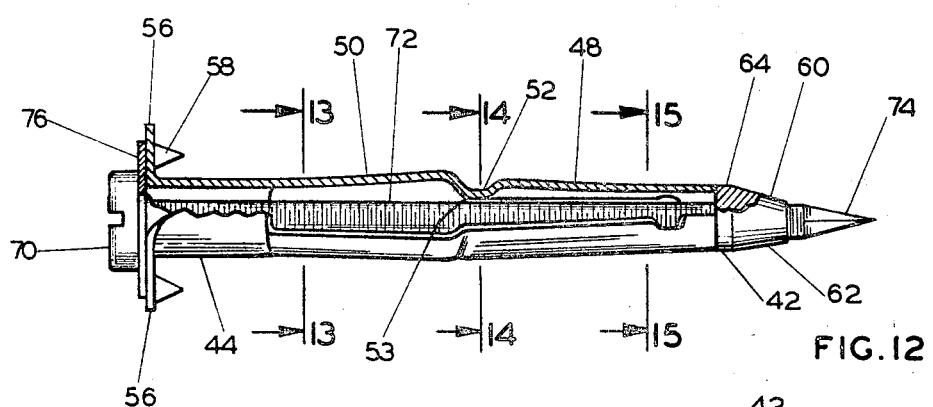
FIG.17
FIG.12
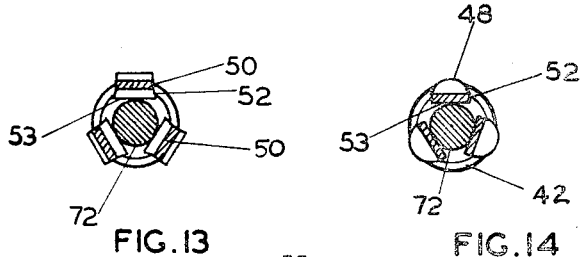
FIG.13    FIG.14    FIG.15
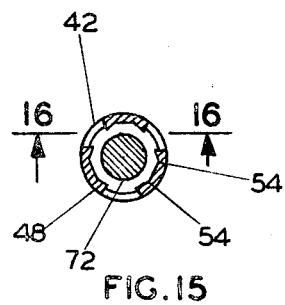
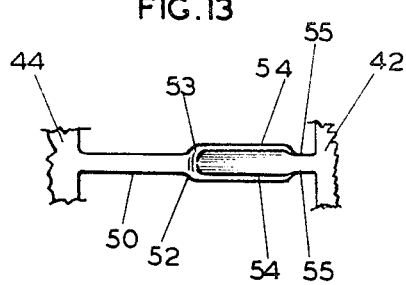
FIG.16
INVENTOR.
ANTON TENDLER
BY

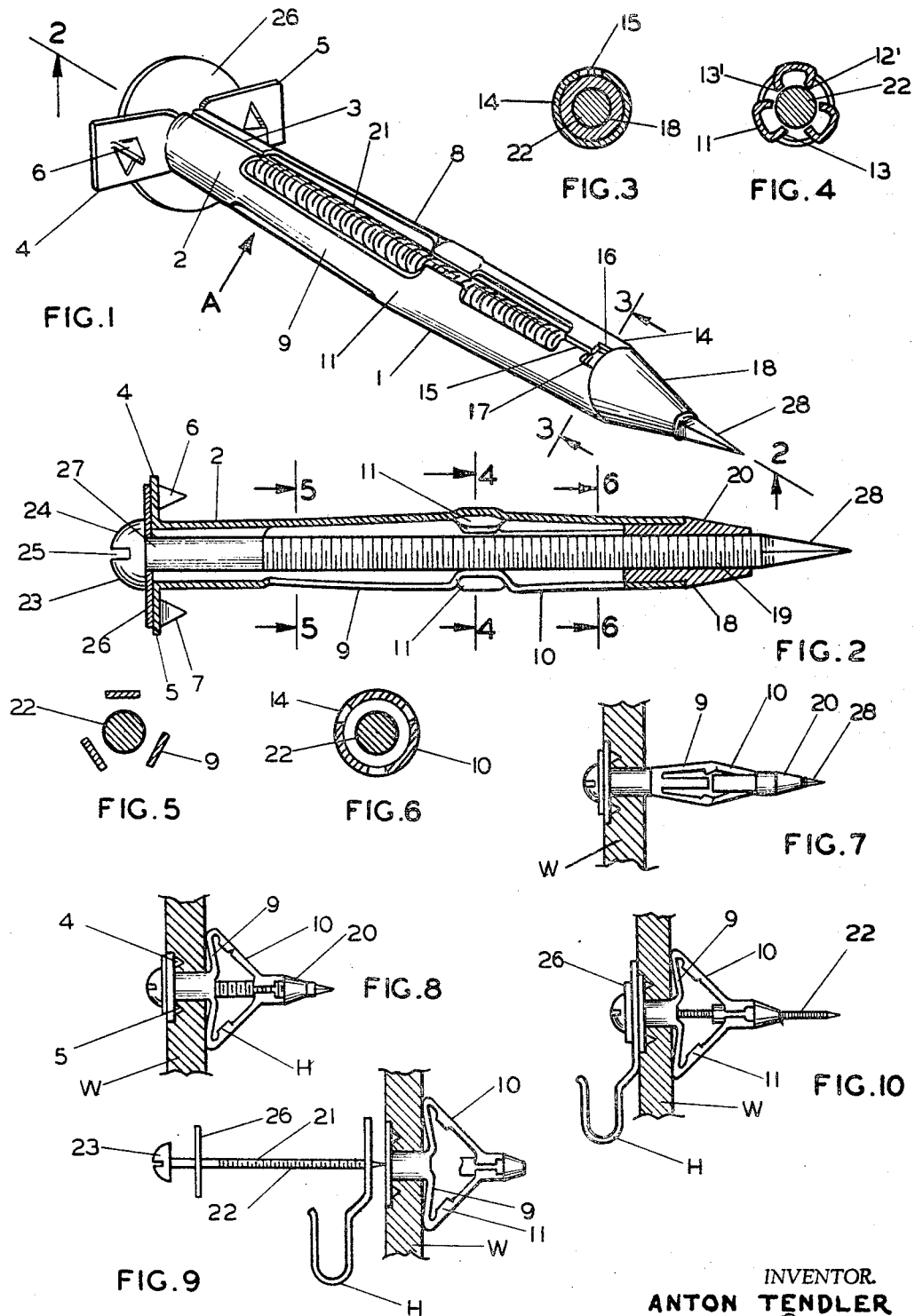

United States Patent Office 3,398,627
Patented Aug. 27, 1968

3,398,627
ANCHOR BOLTS
Anton Tendler, 1255 Grover Road,
St. Louis, Mo. 63125
Continuation-in-part of application Ser. No. 382,916, July 15, 1964. This application Oct. 4, 1966, Ser. No. 584,207
10 Claims. (Cl. 85—71)

ABSTRACT OF THE DISCLOSURE

An anchor bolt having a tubular body consisting of forward and rear collars which are connected by a plurality of bands. The rear band merges into a pair of radial flanges having inwardly struck prongs. The forward collar is fitted with a nut having a frusto-conical surface. A bolt extends through the tubular body and engages the threads of the nut. The portion of the bolt projecting beyond the nut is tapered to a point which forms a continuation of the frausto-conical surface of the nut. Intermediate their ends the bands are provided with indentations which will abut against the bolt and prevent permanent inward deformation of the bands when they are subjected to laterally directed forces.

---

This invention relates to expansion fasteners and, more particularly, to an improved type of anchor bolt designed for piercing a wall or similar structure and becoming securely seated therein.

This application is a continuation-in-part of my co-pending application Ser. No. 382,916, filed July 15, 1964, now abandoned.

In fastening objects, such as picture frames, shelf-brackets, hanger-brackets, and the like, to walls or similar supportive structures, it is frequently desirable to employ an anchor bolt, but devices of this type heretofore on the market have required drilling a large hole through which the shank and anchor sleeve may freely pass. Recently a hammer-driven type of anchor bolt has been developed which is highly satisfactory for use in plaster walls, walls constructed of wallboard, walls of the so-called "dry wall" construction, and even so-called hollow doors. But, such devices occasionally become improperly bent or deformed inwardly when driven into very hard types of wall structures. This is particularly true if the anchor bolt is accidentally struck at an oblique angle while being driven. An inwardly deformed band forming part of such a bolt will bow inwardly against the shank of the bolt when the bolt is tightened and will thereby prevent proper collapse of the anchor body behind the wall.

Among the several objects of the present invention may be noted the provision of an improved type anchor bolt which can be driven into a wall or similar structure for rigid securement therein, the provision of an anchor bolt of the type stated that can be easily and rapidly driven directly into the supporting structure without first boring a hole therein and without accidental deformation resulting from incorrectly directed hammer blows or from undue hardness of the material into which the anchor bolt is being driven; the provision of an anchor bolt of the type stated which is simple in construction, easy to manufacture and economical in cost; and the provision of an anchor bolt of the type stated that is sufficiently strong to withstand deformation upon being driven into a supporting structure, such as plasterboard, plywood, dry-wall construction, or the like, and will not damage the surrounding area of the supporting structure while being driven therein. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated:

FIG. 1 is a perspective view of an anchor bolt constructed in accordance with and embodying the present invention;

FIGS. 2 and 3 are sectional views taken along lines 2—2 and 3—3, respectively, of FIG. 1;

FIGS. 4, 5, and 6 are transverse sectional views taken along lines 4—4, 5—5, and 6—6, respectively, of FIG. 2;

FIG. 7 is a fragmentary sectional view of a wall with an anchor bolt of the present invention driven therein;

FIG. 8 is a fragmentary sectional view of a wall with the anchor sleeve drawn against the inner surface of the wall in permanently installed position;

FIG. 9 is an exploded view of the anchor bolt and a picture hook to be mounted on the wall thereby;

FIG. 10 is a fragmentary sectional view of the wall with the anchor bolt and picture hook mounted thereon in completely installed position;

FIG. 11 is a perspective view of a modified form of anchor bolt constructed in accordance with and embodying the present invention;

FIG. 12 is a side elevational view, partially broken away and in section, of a modified form of anchor bolt;

FIGS. 13, 14, and 15 are sectional views taken along lines 13—13, 14—14, and 15—15, respectively, of FIG. 12;

FIG. 16 is a sectional view taken along line 16—16 of FIG. 15; and

FIG. 17 is a fragmentary sectional view of a wall with a modified form of anchor bolt installed therein.

Corresponding reference characters indicate corresponding part throughout the several views of the drawings.

Referring now in more detail and by reference characters to the drawings, which illustrate a preferred embodiment of the present invention, A designates an anchor bolt which comprises a tubular body or anchor sleeve 1 having a rear tubular collar-portion 2 provided with an axial split 3 which results from the fact that sleeve 1 is formed out of initially flat stock (the end at the left-hand side of FIGS. 1 and 2 being referred to as the "rear" end). Collar-portion 2 is integrally provided at its rear end with a pair of laterally projecting flat flanges 4, 5, each of which is provided with inwardly struck wall-penetrating prongs 6, 7, respectively, reference being made to FIG. 1. Collar-portion 2 is provided at its forward end with three circumferentially spaced axially extending bands 8, each integrally including a substantially flat section 9 and transversely bowed section 10, which are connected approximately midway of the length of band 8 by a preformed indentation 11, as a result of which marginal portions of band sections 10 are struck inwardly for a portion of their length to form pairs of somewhat radial lugs 12, 13, having inwardly presented abutment faces 12' and 13', respectively, as best seen in FIG. 4. It should be noted that band sections 9 are narrower in circumferential width than band sections 10 and that both band sections 9 and 10 are angulated slightly with respect to the longitudinal center-line of sleeve 1, all as best seen in FIG. 2, so that bands 8 initially collapse outwardly when sleeve 1 is subjected to axially directed compressive forces. Bands 8 are integrally joined at their forward ends by a forward tubular collar-portion 14, having an axial split 15 which is aligned with split 3 and is present for the same reason. Collar-portion 14 is also provided, on opposite sides of split 15 and adjacent its forward end, with short laterally extending seats 16, 17. Soldered or otherwise rigidly secured in forward tubular collar-portion 14 is a cylindrical nut 18 having a central internally threaded bore 19 and an external frusto-conical or tapered nose-portion 20, which forms a tapering continuation of band sections 10 and thereby facilitates the entry of anchor bolt A into a wall or other permanent structure W.

Extending axially through rear collar-portion 2 is a bolt 21 which is provided with a threaded shank 22 and a diametrally enlarged head 23, the latter preferably being formed with a rounded top face 24 and a diametral slot 25, which is adapted for accommodating the usual screwdriver or similar tool (not shown). A conventional washer 26 having a central aperture 27 is mounted on shank 22 and interposed between bolt head 23 and the outer surface of wall-engaging flanges 4, 5. It is to be noted that the threads of threaded shank 22 are designed for matching engagement with internally threaded bore 19 of nut 18. The outer or penetrating end of bolt 21 is sharpened in the provision of an elongated needle-like wall-piercing point 28. It can be seen from FIGS. 1 and 2 that piercing point 28 extends through nut 18 and becomes part of the wall-penetrating taper formed by the leading surface of nose-portion 20 and band sections 10.

In use, anchor bolt A, in the assembled form as shown in FIG. 1, can be readily driven into a wall or any suitable supporting structure W very much in the manner of a nail until prongs 6, 7, pierce the outer surface of wall W and flanges 4, 5, are flush so as to hold anchor sleeve 1 within wall W and to prevent turning about its longitudinal axis, thus assuming the position as shown in FIG. 4.

As will be seen in FIG. 4, lugs 12, 13, of each band 8 are of such radial length that the inwardly presented abutment faces 12', 13', thereof are very close to, but spaced a slight distance from, the threads of bolt 21. Thus, if anchor bolt A is struck with an improperly directed blow or is being driven through unduly hard material, bands 8 will not be deformed or bent inwardly so as to become inoperative, but, instead, will always be in a proper position in which they are predisposed toward outward bending around the lines of juncture between band sections 9 and band sections 10 whenever forward collar-portion 14 is drawn toward rear collar-portion 2.

Bolt 21 is thereupon rotated within collar 2 and nut 18 in such manner as to urge nut 18 axially along threaded shank 22. Nut 18, being rigidly secured to collar-portion 14, will also be prevented from turning about its axis. The axial movement of nut 18 will force relatively thin bands 8 first to break outwardly, as shown in FIG. 7, and then bend outwardly so as to assume the position shown in FIG. 8, thereby forming radially projecting somewhat V-shaped wings which retentively engage the inner surface of wall W to hold anchor sleeve 1 securely within wall W. By reason of the fact that band sections 9 are narrower in circumferential width than band sections 10 and flat in cross-sectional contour, the axial force which causes collar-portion 14 to be drawn axially toward collar-portion 2 will deform bands 8, as above noted, and cause the latter to form apices which bear against the interior face of wall W at points which are spaced radially outwardly from the axial line of sleeve 1, thereby applying uniformly distributed equilateral retentive force to the entire structure. Bolt 21 can then be turned in the opposite direction, unthreaded from nut 18, and thereupon removed from anchor sleeve 1, leaving the latter firmly installed within wall W.

Bolt 21 may then be inserted through the aperture $a$ of a conventional wall-mounted element, such as picture hook H. It will be understood that picture hook H is shown only for purposes of illustration and it is obvious that any other type of wall-mounted element may be similarly employed. Thereupon, bolt 21 is reinserted through rear collar-portion 2 and nut 18. For this purpose, point 28 serves as a "finder" and readily guides bolt 21 into threaded bore 19 of nut 18. Bolt 21 is then tightened in any convenient manner so as to be rigidly seated within anchor sleeve 1, substantially as shown in FIG. 10.

Referring now to FIGS. 11–16, it is possible to provide a modified form of anchor bolt B which is very similar to anchor bolt A and comprises a tubular body or sleeve 40 integrally including forward and rear collar-portions 42, 44, respectively, which are connected by means of three axially extending bands 46. Each band 46 includes a transversely bowed forward band section 48 and a transversely flat rear band section 50, forward and rear band sections 48, 50, being integrally joined at an inwardly projecting transversely extending crimp or protuberance 52. Crimps 52 are linear and inwardly terminate at three circumferentially spaced transversely extending linear abutment margins 53, as best seen in FIGS. 12 and 14. Immediately rearwardly from crimp 52 rear section 50 bows abruptly outwardly, as best seen in FIG. 2, and then extends rearwardly toward rear collar-portion 44 at an angle of approximately 1½° with respect to the axial centerline of tubular body 40. Similarly, forward band section 48 bows abruptly outwardly immediately forward from crimp 52 and thereafter extends forwardly toward forward collar-portion 42 also at an angle of approximately 1½° with respect to the axial centerline of tubular body 40. It should be noted that forward band sections 48 are somewhat greater in axail width than rear band sections 50, and that the arcuate contour thereof can be established by a simple stamping operation which imparts two longitudinally extending crimps 54 in the inwardly presented face of forward section 48. This produces a smooth arcuate contour on the outer face which conform to the contour of forward-collar portion 42. Moreover, the axial width of each forward section 48 is such that its linear and parallel side margins are substantially coplanar with and perpendicular to the particular crimp 52, at which they rearwardly terminate, as best seen in FIGS. 2 and 14. Thus, the center portion of each forward band 48 bows abruptly outward while the side margins remain substantially coplanar with crimp 52. This particular construction not only rigidifies forward band 48 but also lends itself to high speed stamping operations. At the juncture of forward band sections 48 and forward collar-portion 42, the former are provided with slight indentations or notches 55 so as to establish points of weakness at which forward band sections 48 can deform outwardly with respect to forward collar-portion 42 when body 40 is subjected to axially directed compressive forces. In this regard, it should be noted that the arcuate cross-sectional shape of forward band sections 48 rigidifies such band sections and prevents them from deforming intermediate their ends. Rear collar-portion 44 is provided with a pair of laterally extending flanges 56, each having an inwardly struck wall-penetrating prong 58. It should be noted that tubular body or sleeve 40, like sleeve 1, is preferably stamped from flat sheet stock which is subsequently rolled or otherwise formed into a tubular configuration.

Rigidly welded to the forward annular margin of forward-collar portion 42 is a nut 60 having a frustoconical or tapered leading face 62 which merges into a cylindrical outer face 64 of substantially equivalent diameter to forward collar-portion 42 so that the external surface of nut 60 forms a continuation of tubular body 40. Nut 60 is further centrally provided with a threaded bore 66 for engagement with an axially extending bolt or machine screw 68 having a slotted head 70 and a threaded shank 72, the latter of which forwardly terminates at a tapered piercing point 74. Encircling shank 72 between head 70 and flanges 56 is a flat washer 76. When machine screw 68 is screwed inwardly to its fullest extent, that is when head 70 thereof is disposed adjacent washer 76 and flanges 56, tapered piercing point 74 forms a tapering continuation of tapered leading face 62 on nut 60.

It is significant to note that the inwardly presented transversely extending abutment margin 53 of each crimp 52 is disposed in very close proximity to shank 72 of machine screw 68, as best seen in FIGS. 2 and 14, so that when laterally directed forces are applied to bands 46, bands 46 will not deform inwardly. Accordingly, when one of bands 46 is subjected to an inwardly directed lateral force, it will bend slightly inwardly until abutment margin 53 of its crimp 52 engages shank 72 of machine screw 68, thereby retarding further inward deformation. When the force is released, band 46, owing to its natural resiliency, will spring back to substantially its original shape. Thus, the slight outwardly directed angle of forward and rear band sections 48, 50, remains substantially unchanged and is not altered to the extent that bands 46 will deform inwardly instead of outwardly when anchor body 42 is subjected to compressive axial forces.

Anchor bolt B is installed in a wall or other supporting structure similarly to anchor bolt A, all as best seen in FIGS. 7-10. The presence of crimps 52 makes the possibility of the bands deforming inwardly during installation remote, even when anchor bolt 73 is struck obliquely or driven through extremely hard substances. When bolt 73 is tightened, initial collapse of bands 46 occurs immediately rearwardly from crimps 52 where rear band sections 50 bow abruptly outwardly. Such points form apices on bands 46 upon continued advancement of nut 60 on shank 72 and ultimately engage the rear surface of the wall or other supporting structure to firmly secure tubular anchor body 40 therein, all as best seen in FIG. 17.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An anchor bolt adapted to be driven into a supporting structure such as wallboard; said anchor bolt comprising a tubular body and a bolt pre-assembled thereto, said body including a forward collar, a rear collar located in axially spaced relation to the forward collar, and a plurality of axially extending bands interconnecting the collars, the bands extending outwardly from the forward and rear collars at slight angles with respect to the axial centerline of the tubular body and being provided intermediate their ends with inwardly projecting protuberances which inwardly terminate at abutment surfaces; at least one wall-engaging flange projecting outwardly from the rear collar; a nut on the forward collar having a forwardly tapered leading face; and said bolt having a threaded shank extending through the body and being threaded into the nut for exerting an axially directed compressive force on the body, the bolt having a pointed tip located beyond the nut and forming a tapered continuation of the leading face of the nut for piercing the supporting structure when the opposite end of the bolt is struck; the abutment surfaces of the protuberances being normally spaced outwardly from but disposed in close proximity to the shank of the bolt, and the length of the bands, the spacing between the abutment surfaces and the shank of the bolt, and the resiliency of the material from which the body is formed all being such that should any one of the abutment surfaces during the course of driving the bolt be pressed into contact with the shank of the bolt and thereafter released, the bands will still extend outwardly from the collars at slight angles with respect to the axial centerline of the body whereby the bands will deform outwardly when the bolt is tightened.

2. An anchor bolt according to claim 1 in which the end of the bolt shank located beyond the nut is tapered to a point so that the anchor bolt can be forcibly inserted through a supporting structure without first forming a hole.

3. An anchor bolt according to claim 1 in which the inwardly projecting protuberances are inwardly struck radial lugs located in transverse alignment on opposite marginal sides of the bands.

4. An anchor bolt according to claim 1 in which the inwardly projecting protuberance divides the band into forward and rear band sections, each band section extending outwardly from its respective collar at a slight angle with respect to the axial centerline of the tubular body so that the bands will deform outwardly when the body section is axially compressed by the bolt.

5. An anchor bolt according to claim 4 in which each protuberance is a transversely extending crimp formed in its respective band, and in which the abutment margin is the inwardly presented transversely extending margin formed by the crimp.

6. An anchor bolt according to claim 5 in which the rear band sections bow abruptly outwardly from their respective crimps whereby to establish points of initial collapse for the bands.

7. An anchor bolt according to claim 6 in which the forward band sections are transversely bowed and the rear band sections are transversely flat.

8. An anchor bolt according to claim 7 in which the crimps are substantially linear and the side margins of the forward band sections are substantially coplanar with their respective crimps.

9. An anchor bolt according to claim 8 in which the nut is provided with a forwardly tapered leading face and the bolt is tapered beyond the nut so as to form a continuation of the forwardly tapered leading face.

10. An anchor bolt according to claim 8 in which the forward band sections are provided with inwardly cut notches adjacent the forward collar so as to establish points of weakness for initial collapse of the forward band sections.

References Cited

UNITED STATES PATENTS

| 3,143,916 | 8/1964 | Rice | 85—71 |
| 2,559,281 | 7/1951 | Croessant | 85—71 |
| 2,762,252 | 9/1956 | Karitzky | 85—71 |
| 3,143,915 | 8/1964 | Tendler | 85—71 |

FOREIGN PATENTS

| 212,600 | 7/1961 | Australia. |
| 608,218 | 9/1948 | Great Britain. |

MARION PARSONS, JR., *Primary Examiner.*